R. L. RICKMAN.
METHOD AND MACHINE FOR MAKING CEMENT SEWER PIPE.
APPLICATION FILED JUNE 9, 1910.
1,013,954.
Patented Jan. 9, 1912.
2 SHEETS—SHEET 1.
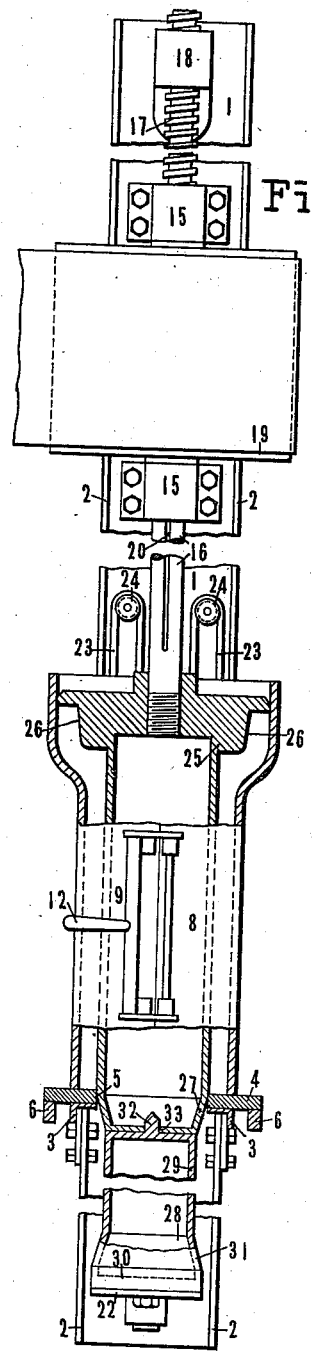
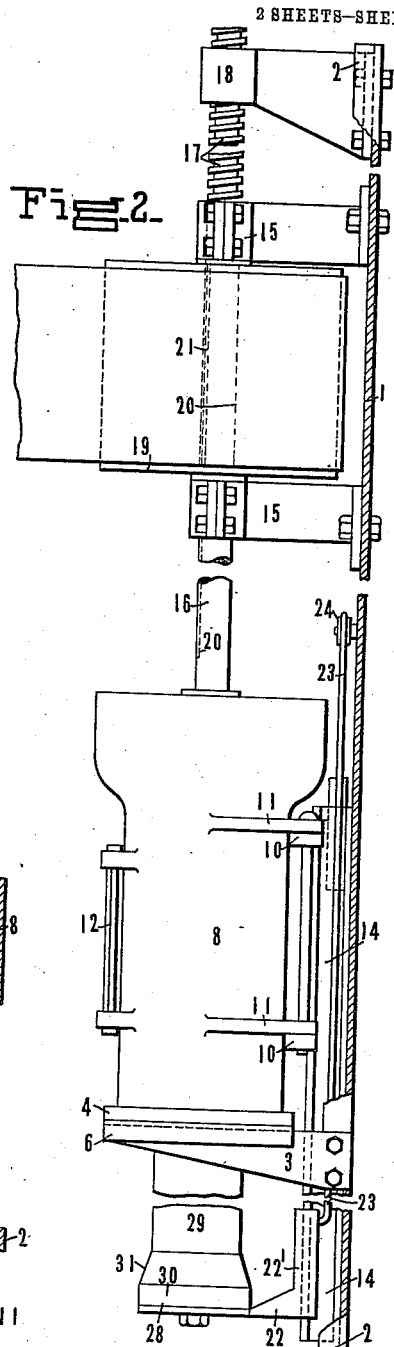
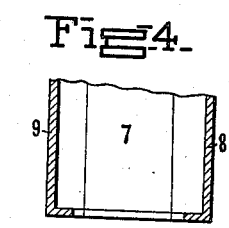
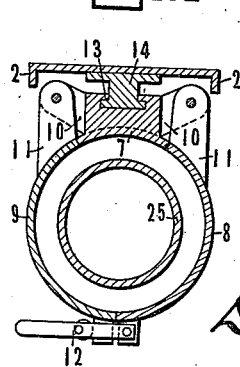
WITNESSES:
INVENTOR
BY
ATTORNEYS

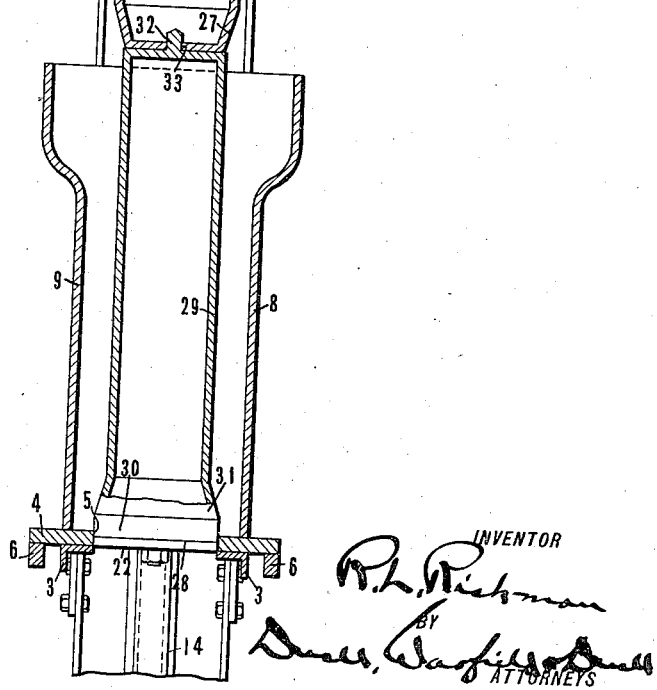

UNITED STATES PATENT OFFICE.

ROBERT LEE RICKMAN, OF VANCOUVER, BRITISH COLUMBIA, CANADA.

METHOD AND MACHINE FOR MAKING CEMENT SEWER-PIPE.

1,013,954.   Specification of Letters Patent.   Patented Jan. 9, 1912.

Application filed June 9, 1910. Serial No. 566,076.

*To all whom it may concern:*

Be it known that I, ROBERT L. RICKMAN, a citizen of the United States, residing at Vancouver, in the county of Vancouver and Province of British Columbia, Dominion of Canada, have invented certain new and useful Improvements in Methods and Machines for Making Cement Sewer-Pipe, of which the following is a full, clear, and exact description, such as will enable others skilled in the art to which it appertains to make and use the same.

This invention relates to methods and machines for the manufacture of sewer pipe of cement and similar non-elastic material, and with respect to the more specific features, to methods and machines for making cement sewer pipe of an even texture and density.

One of the objects of the invention is the manufacture of cement sewer pipe having bell ends, but it will also be obvious that the method and the machine are adapted to make sewer pipe without bell ends, if desired.

Another object of the invention is to produce a machine in which the pipe mold may be readily removed and replaced by another of different size, and at the same time perfect alinement be assured.

Another object of the invention is the production of a pipe of even texture and density, and the interior surface of which shall be impervious to water.

Another object of the invention is to produce a pipe having an enameled interior surface or finish.

Other objects will be in part obvious and in part pointed out hereinafter.

My improved method of making pipe from cement and similar plastic or nonelastic material comprises the production of the channel from a mass of the material by continuously condensing successive portions of the plastic material, and while this operation is going on, dressing or troweling the surface so formed. In its simple form the plastic material is supported in a mold or shell conforming to the shape of the exterior surface of the pipe to be made, and by suitable devices the central portion of the material is driven toward the wall of the mold, thus condensing the material and producing the channel of the pipe, and at the same time forming the pipe wall, which latter will be of uniform density and texture, impervious to water and have an enamel finish. Furthermore, when the pipe is formed as above described, I compress it while in its plastic state, thereby further compacting the material and adding greatly to its efficiency and utility.

The invention accordingly consists in the method above described, including the collective and several steps, and in the features of construction, combinations of elements and arrangement of parts which will be exemplified in the construction hereinafter set forth, and the scope of the application of which will be indicated in the following claims.

In the accompanying drawings wherein similar reference characters refer to similar parts throughout the several views,—Figure 1 represents a front elevation of the cement sewer pipe machine, partly in section for the sake of clearness; Fig. 2 represents a side elevation of the machine; Fig. 3 is a detail sectional view of the shell or mold; Fig. 4 is a sectional view of the lower end of a modified form of mold, showing a flange; and Fig. 5 is a longitudinal sectional view, showing the ram and fill-ram in elevated starting position with respect to the mold, parts being omitted for the sake of clearness.

The numeral 1 indicates an upright main frame, constructed preferably of channel steel, including the usual upstanding flange 2. It is obvious that this frame may be made of cast metal, or of wood or other suitable material, if desired. From the opposite sides of the lower portion of the main frame project brackets 3 supporting a table or pallet 4 having an opening 5. This table is preferably made of wood, is provided with flanges 6, and is adapted to support the mold in which the pipe is made. The mold may be of any suitable or approved construction, but in the present instance I prefer to provide a mold or shell consisting of three sections; a back section 7, and two front sections, 8 and 9, the latter two pivoted to the back section, the whole forming a structure adapted to be opened for the removal of the pipe. Preferably the section 7 is provided with upper and lower projecting arms 10, and similar arms 11 on the mold sections 8 and 9 are pivoted to the arms 10. The mold is held closed by the handled hasp 12, pivoted to one of the front sections and removably engaging suitable lugs on the other front section. The free end of the hasp comprises an eccentrically pivoted bar, circular in cross section, and the handle is attached to the bar, permitting the sections of the mold to be locked in closed position. The mold is preferably of a cylindrical conformation having an enlarged, bell-shaped end portion to provide for the joining of several similar pipes together. The sections 8 and 9 each comprise 150 degrees, more or less, of a circular arc, while the back section 7 comprises 60 degrees, more or less. While I prefer the dimensions of the sections just mentioned, it is obvious that the several sections may include a greater or less number of degrees, as may be desired.

The mold is designed to slide on the tongue 14, and in operative position to rest upon the pallet 4, with its wall spaced from the opening 5 in the pallet. The pallet between the wall of the mold and the surface of the ram or core constitutes a flanged end of the mold, and the width of this flange defines the opening in the mold in which the pipe is formed, and the flange supports the material of which the pipe is made. It is obvious, however, that many other constructions will serve the same purpose; among others, the mold itself may be provided with an inwardly extending portion or flange, as shown in Fig. 4.

The back section 7, at its rear portion, is channeled longitudinally of the mold, as at 13, for the purpose of engaging an alining tongue 14 secured to the main frame 1. This tongue may be of any suitable shape in cross section to correspond with the groove in the back mold section, but I preferably make the tongue of T-shape in cross section, and the back section of the mold is made with a groove of a similar shape to engage the tongue. The tongue 14 extends from the lower portion of the main frame 1 to a point a sufficient distance above the table 4 to accommodate the molds of different heights which may be employed in the operation of the machine. It will also be perceived that this construction permits the mold to be readily removed from the machine by sliding it off the end of the tongue.

Bolted to and projecting from the main frame 1 at suitable points are bearings or journal brackets 15 guiding an operating shaft 16. This shaft is provided with screw threads 17 which engage with a stationary nut 18, also secured to and projecting from the main frame 1. Connected to the screw shaft 16 so as to rotate the same, but permitting the shaft to move longitudinally with respect thereto, is a belt pulley 19. This pulley is centered on the shaft between the bearings 15, and is thereby permitted to rotate, but is restrained from longitudinal movement. The connection between the pulley 19 and the shaft 16 may be of any of the usual forms to effect both translation and rotation of the shaft 16, but in the present instance I prefer to provide the shaft 16 with a slot 20 loosely engaged by a key 21 on the pulley.

With the construction thus far described, it will be clear that when the pulley 19 is rotated the key and slot connection with the shaft 16, forces the latter to rotate but permits the shaft 16 to move longitudinally, the latter movement being produced by the engagement of the screw threads 17 with those of the stationary nut 18. The longitudinal movement of the operating shaft 16 may be either upwardly or downwardly, depending upon the direction of rotation of the pulley 21.

Sliding on the tongue 14 is a base or platform 22 attached to an upwardly extending arm 22', and the relationship between the tongue and this arm is preferably the same as that between the mold section 7 and the tongue; namely, the arm is provided with a T-shaped groove to engage the tongue. The platform is thus adapted to slide up and down upon the tongue, and for the purpose of maintaining the same in an elevated position and at the same time permitting it to readily descend, cords 23 are attached to the arm 22' at one end and pass over pulleys 24 on the main frame, weights being attached to the other end of the cords.

Secured to one end of the shaft 16, preferably by screw threads, is a ram 25. This ram may be made of any suitable material, but in the present instance is made of metal and is hollow to reduce its weight. The body portion of the ram is cylindrical, its upper end terminating in a thick and solid head for the attachment of the operating shaft, and the head is provided with shoulders 26, the configuration of the ram at this point corresponding to and adapted to form the enlarged bell end of the pipe. The other end of the ram has a tapered deflecting surface 27, and terminates in a flat end or head, the ram at this point presenting a structure similar to a truncated cone.

The ram is designed to pass through the mold and is of such a length as to extend from the upper end of the mold to its lower end, and beyond. The diameter of the cylindrical portion of the ram is less than that of the mold by the thickness of the pipe desired, and corresponds also with the size of the opening 5 in the pallet 4. It will be observed that when the ram is in its lowest position in the mold, as shown in Fig. 1, the cylindrical portion thereof has entered the opening 5 in the pallet 4 and the conical portion extends below the pallet. The ram being attached to the shaft 16, moves up and down therewith and in its extreme upper position the flat head of the ram is designed to be above the upper end of the mold.

Supported on the platform 22 is a fill-ram 28 having an upper cylindrical portion 29 and a lower cylindrical portion or shoulder 30 larger than the upper cylindrical portion, these two portions being connected by an inclined or conical surface 31, as clearly shown in the drawings. The size of the fill-ram at the cylindrical portion 30 is made to fit accurately the opening 5 in the pallet 4, in order to retain the loose material in the mold when the fill-ram is in its initial operative position.

In operation, it is designed that the fill-ram shall abut the head end of the ram, and in order to center the two and aline their movement, the fill-ram is provided with a projection 32 which engages an opening 33 in the head of the ram. The fill-ram may be secured to the support 22 in any suitable manner; it may be fixed thereto by bolts, as shown, or it may be pivoted to rotate upon the support, as may be deemed preferable.

By reason of the fixed connection between the ram 25 and the shaft 16, operation of the latter through the pulley 19 will not only move the ram longitudinally into and out of the mold, as the case may be, a movement of translation, but it will also rotate the ram. If the fill-ram is bolted to its support, the ram will rotate with respect thereto. Should the fill-ram be pivoted to its support, it may rotate with the ram.

In operation, the ram and the fill-ram abut each other at the head end of the ram, as described, and the two together form a shaft or movable core for the mold, the enlarged surface 30 of the fill-ram constituting a retaining portion at the lower end of the core and the ram constituting a molding portion above the retaining portion. The diameter of the portion 30 is the same as that of the cylindrical portion of the ram, as each is intended to fit the opening 5. The diameter of the cylindrical portion 29 of the fill-ram is less than the cylindrical portion of the ram, and provides a space in the mold ahead of the deflecting portion 27 of the ram, and the material in this space is pressed laterally and condensed against the wall of the mold and held by the following cylindrical portion of the ram.

The operation of the machine is as follows: The ram 25 being in an elevated position, the mold is applied to and slid upon the tongue 14, and closed and locked by the handled hasp. The wooden pallet 4 is then placed on the brackets 3 so that the openings in the mold and the pallet register one with the other. The fill-ram 28 is then raised up through the mold or shell until the pin 32 is inserted in the ram 25. The fill-ram is held yieldingly against the ram by the weights attached to the cords 23. The mold is now filled and the ram set in motion by a suitable belt or other device applied to the pulley 19. As the ram descends, it forces the fill-ram out, following in the opening left. As the ram 25 is larger than the fill-ram, the tapered end of the ram deflects and presses the material outward against the wall of the mold in such a manner as to compress it very densely. It is designed that the ram 25 shall revolve about three times to each inch of penetration, and it therefore distributes the material equally about the wall of the mold, thus insuring a pipe of even texture and density. At the same time this revolving of the ram gives the inner wall of the pipe a "troweling" effect, brings an extra amount of plastic cement to the surface, which is practically impervious to water, and makes an enameled finish on the interior surface of the pipe. As the ram approaches its lowest position, the shoulder 26 enters the mold. As this shoulder closely fits the mold, its continued descent not only gives the bell shape to the pipe, but the material thereof is strongly compressed between the said shoulder and the face of the pallet 4, resulting in a pipe wall of great compactness and strength. When the ram has descended such distance as may be required, preferably along an extent required to mold the length of material in the mold, it is returned to proper position above the mold, the fill-ram being retained in lower position in any suitable way. The mold is now opened and the pipe removed.

In order that the plastic material of which the pipe is formed shall not be forced out between the smaller cylindrical surface 29 of the fill-ram and the edge of the opening 5 when the fill-ram has descended to such an extent that the surface 30 has emerged from the opening 5 in the pallet, it is customary, before starting the ram, to tamp the material between the wall of the mold and the lower portion of the fill-ram. This preliminary tamping is also desirable because the enlargement of the fill-ram reduces the amount of material at this point, resulting otherwise in a variation in the density of the pipe.

From the above, it will be perceived that I have devised a method and a machine capable of quickly and efficiently producing a strong and compact pipe from plastic material, which, notwithstanding the simplicity of its method of manufacture, will be provided with an enamel surface impervious to water.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense. It is also to be understood that the language used in the following claims is intended to cover all of the generic and specific features of the invention herein described and all statements of the scope of the invention, which, as a matter of language, might be said to fall therebetween.

Having described my invention, what I claim as new and desire to secure by Letters Patent is:

1. In apparatus of the character described, in combination, a mold, a sectional core, means to move the mold and core relatively to each other, and means to cause relative rotative movement between the sections.

2. In apparatus of the character described, in combination, a mold, a molding core therein, means to move the core longitudinally of the mold, the core being of a length to extend throughout the mold at any point in its molding movement, and means to rotate the core.

3. In apparatus of the character described, in combination, a mold, a molding core therein, means to move the core longitudinally of the mold, the core being of a length to extend throughout the mold at any point in its movement, and means to give the core simultaneous movement of translation and rotation.

4. In apparatus of the character described, in combination, a hollow mold having a flange adapted to retain material to be molded, said flange defining an opening in the mold, a movable sectional core in the mold adapted to extend throughout the mold during its movement, means to move the core longitudinally of the mold, and means to rotate a section of the core with respect to another.

5. In apparatus of the character described, in combination, a hollow mold having a flange adapted to retain material to be molded, said flange defining an opening in the mold, a movable sectional core in the mold adapted to extend throughout the mold during the molding movement, means to give the core a movement of translation, and means to rotate one section relatively to another.

6. In apparatus of the character described, in combination, a hollow mold having a flange adapted to retain material to be molded, said flange defining an opening in the mold, a sectional core in the mold concentric thereto and adapted to extend throughout the mold during its movement, means to move the core longitudinally of the mold, and means to rotate a part of the core with respect to another.

7. In apparatus of the character described, in combination, a hollow mold having a flange adapted to retain material to be molded and defining an opening in the mold, a movable sectional core in the mold adapted to extend throughout the mold during its movement and concentric thereto, comprising a retaining and a molding portion, and means to cause relative movement between the core and the mold and between the sections.

8. In apparatus of the character described, in combination, a mold, a flange therefor adapted to retain material to be molded and defining an opening in the mold, a movable sectional core in the mold comprising a retaining portion adapted in one position to close the opening and a molding portion adapted to deflect the material to be molded toward the wall of the mold and to enter the opening, and means to move the core longitudinally of the mold.

9. In apparatus of the character described, in combination, a mold, a flange therefor adapted to retain material to be molded and defining an opening in the mold, a movable sectional core in the mold comprising a retaining portion adapted in one position to close the opening and a molding portion adapted to deflect the material to be molded toward the wall of the mold and to enter the opening, means to move the molding portion of the core longitudinally of the mold, and means to rotate the core.

10. In apparatus of the character described, in combination, a mold, a flange therefor adapted to retain material to be molded and defining an opening in the mold, a sectional core in the mold comprising a retaining portion adapted in one position to close the opening and a molding portion adapted to deflect the material to be molded toward the wall of the mold and to enter the opening, and means to give the molding portion of the core a simultaneous movement of translation and rotation.

11. In apparatus of the character described, in combination, a core comprising a ram having a centering opening, a fill-ram adapted to abut the ram having a fixed centering pin adapted to enter the opening, and means to removably join the ram to the fill-ram.

12. In apparatus of the character described, in combination, a ram, a fill-ram, and means to rotate the ram with respect to the fill-ram.

13. In apparatus of the character described, in combination, a ram, a fill-ram, rotatably joined thereto, means to move each longitudinally, and means to rotate the ram.

14. In apparatus of the character described, in combination, a ram, a fill-ram loosely abutting the ram, a pin centering the ram with respect to the fill-ram, means to move each longitudinally, and means to rotate the ram.

15. In apparatus of the character described, in combination, a ram, a fill-ram abutting the ram, a pin centering the ram with respect to the fill-ram, and means to simultaneously move the ram and fill-ram longitudinally and the ram rotatably.

16. In apparatus of the character described, in combination, a mold, a fill-ram adapted to enter the mold, and means to yieldingly support the fill-ram.

17. In apparatus of the character described, in combination, a mold, a fill-ram adapted to enter the mold, a sliding support for the fill-ram, and means comprising weights and cords to yieldingly support the fill-ram.

18. In apparatus of the character described, in combination, a table having an opening, and a shaft or fill-ram yieldingly supported in position to enter the opening.

19. In apparatus of the character described, in combination, a mold, a fill-ram adapted to enter the mold at one end, and a ram adapted to enter the mold at the other end.

20. In apparatus of the character described, in combination, a shell having a mold opening therethrough, a ram adapted to pass through the opening, a fill-ram, means for yieldingly supporting the fill-ram in the path of the ram, and means to move the ram.

21. In apparatus of the character described, in combination, a mold, a fill ram adapted to enter the mold, and yielding means adapted to cause the fill ram to be automatically moved to enter the mold.

22. In apparatus of the character described, in combination, a main frame, bearings fixed thereto, a stationary nut thereon, a threaded operating shaft in the bearings and engaging the nut, said shaft having a longitudinal slot, a driving pulley on the shaft between the bearings, a key on the pulley loosely engaging the slot in the shaft, and a ram secured to the shaft.

23. In apparatus of the character described, in combination, a frame, a shaft supported thereby, means to move the shaft longitudinally, means to rotate the shaft, a ram secured to the shaft, a fill-ram, and means to yieldingly support the fill-ram.

24. In apparatus of the character described, in combination, a main frame, a threaded operating shaft journaled on the frame, a stationary nut engaged by the threaded shaft, means to rotate the shaft, a ram secured to the shaft, a fill-ram, a movable platform to which the fill-ram is secured, and means to yieldingly support the platform.

25. In apparatus of the character described, in combination, a main frame, bearings fixed thereto, a stationary nut thereon, a threaded operating shaft in the bearings and engaging the nut, said shaft having a longitudinal slot, a driving pulley on the shaft between the bearings, a key on the pulley loosely engaging the slot in the shaft, a ram secured to the shaft, a fill-ram, a platform to which the fill-ram is secured, said platform having a groove, a tongue on the frame engaging the groove in the platform, a pulley journaled on the frame, and a weighted cord attached to the platform and passing over the pulley to yieldingly support the platform.

26. In apparatus of the character described, in combination, a mold, a fill-ram adapted to move into and out of the mold and having a shaft portion adapted to be spaced from the walls of the mold and a shouldered portion to fill an opening in the mold, and yielding supporting means for the fill-ram.

27. In apparatus of the character described, in combination, a mold, a sectional core therefor, means adapted to bring the sections into contact and to move the core longitudinally of the mold, and yielding means whereby the sections may be separated longitudinally of the mold.

28. In apparatus of the character described, in combination, a main frame, a table or pallet thereon to support a mold, a ram, and a tongue on the frame to aline the mold and ram.

29. In apparatus of the character described, in combination, a main frame, a table or pallet thereon having an opening, a ram, and a tongue on the frame to aline the mold and ram.

30. In apparatus of the character described, in combination, a main frame, a table or pallet stationarily positioned thereon to support a mold in a predetermined position, and a tongue on the frame extending above and below the table.

31. In apparatus of the character described, in combination, a main frame, a table or pallet stationarily positioned thereon to support a mold, a tongue on the frame extending above and below the table, and a fill-ram freely engaging the tongue and guided in its movement thereby.

32. In apparatus of the character described, in combination, a shell defining a mold opening, a ram positioned to move into the mold opening, a fill-ram supported in the mold opening, a yielding support for the fill-ram, and means to rotate and move the ram through the mold opening.

33. In apparatus of the character described, in combination, a shell defining a mold opening, a ram positioned to move into the mold opening, a fill-ram supported in the mold opening and against the ram, a yielding support for the fill-ram, and means to rotate and move the ram through the mold opening.

34. In apparatus of the character described, in combination, a support, a table adapted to support a mold, a ram on the support movable toward and from the table, and a fill-ram on the support movable toward and from the table and adapted to abut the ram.

35. In apparatus of the character described, in combination, a support, a mold, a core adapted to extend throughout the mold during the molding movement and composed of sections, means for automatically moving the core in the mold, and means permitting the separation of the sections in order to manipulate the mold.

36. In apparatus of the character described, in combination, a mold, an automatically movable molding core therefor adapted to extend throughout the mold during the molding movement, and means permitting the separation of the core into sections, said sections adapted to leave the mold at the opposite ends thereof.

37. In apparatus of the character described, in combination, an upright frame, a table projecting therefrom, a mold adapted to rest on the table and movable up and down on the frame, a shaft, a core portion secured to the shaft to enter and leave the mold at one end, and a second core portion carried by the frame and adapted to enter and leave the mold at the other end.

38. In apparatus of the character described, in combination, an upright frame, a table projecting therefrom, a mold adapted to rest on the table, engaging means between the mold and the frame permitting the mold to move up and down relatively to the frame, a shaft, a ram secured to the shaft to enter and leave the mold at one end, and a fill-ram yieldingly carried by the frame and adapted to enter and leave the mold at the other end.

39. In apparatus of the character described, in combination, an upright frame, a mold engaging the frame, the engaging means permitting the mold to move up and down, means to locate the mold at a predetermined position, a shaft, a ram secured to said shaft and adapted to enter and leave the mold, means to give the shaft simultaneous movements of rotation and translation, a table engaging the frame and adapted to move up and down beneath the mold, a fill-ram carried by the table in alinement with the mold, and yielding means to hold the table in elevated position.

40. In an apparatus of the character described, in combination, a mold, a fill-ram adapted to move into and out of one end of the mold, a ram, means to move the ram into another end of the mold and means to preserve the alinement of the ram and fill ram.

41. In an apparatus of the character described, in combination, a mold, a fill-ram adapted to move into and out of one end of the mold, a ram, means to move the ram into and out of another end of the mold and means to preserve the alinement of the ram and fill ram.

42. In an apparatus of the character described, in combination, a mold, a fill-ram adapted to move into and out of one end of the mold, a ram, means to move the ram into and out of the other end of the mold, and means to rotate the ram.

43. In an apparatus of the character described, in combination, a mold, a fill-ram adapted to move into and out of one end of the mold, a ram, and means to give the ram a simultaneous movement of translation and rotation into and out of the other end of the mold.

44. In an apparatus of the character described, in combination, a ram, a fill-ram, and means adapting the ram and the fill-ram to move toward and from each other while preserving their alinement with each other.

45. In an apparatus of the character described, in combination, a mold comprising means at one end to define the end of a pipe, a core therein, and means to move the core toward the defining means to define the surface of the pipe.

46. In an apparatus of the character described, in combination, a hollow mold having means to retain material to be molded, a core in the mold comprising a plurality of sections longitudinally of the mold, and means to cause relative longitudinal movement of the sections.

47. In an apparatus of the character described, in combination, a hollow mold having means to retain material to be molded, a core in the mold comprising a plurality of sections longitudinally of the mold, each adapted to define the interior surface of a pipe, means to move the core longitudinally of the mold, and means to rotate a section of the core with respect to another.

48. In apparatus of the character described, in combination, an upright supporting frame, a stationarily positioned mold-supporting device projecting therefrom, a longitudinally movable shaft adapted to carry a core portion on one side of said mold-supporting device, a platform adapted to support a second core portion on the opposite side of said mold-supporting device, and means adapted to abut the core portions and form a core co-extensive with the mold.

49. In apparatus of the character described, in combination, an upright supporting frame, a stationarily positioned mold-supporting table having an opening projecting therefrom, a longitudinally movable and rotatably mounted shaft adapted to carry a core portion on one side of said mold-supporting device, a platform adapted to support a second core portion on the opposite side of said mold-supporting device, and means adapted to abut the core portions and form a core co-extensive with the mold.

50. In apparatus of the character described, in combination, an upright supporting frame, an upright alining tongue connected thereto, a stationarily positioned mold-supporting device projecting therefrom, a longitudinally movable shaft adapted to carry a core portion on one side of said mold-supporting device, a platform adapted to support a second core portion on the opposite side of said mold-supporting device and slidable on said tongue, and means adapted to abut the core portions and form a core co-extensive with the mold.

51. In apparatus of the character described, in combination, an upright supporting frame, a mold adapted to be supported in stationary position on said frame, a longitudinally movable shaft adapted to carry a core portion adjacent one end of said mold, a platform adapted to support a second core portion adjacent the opposite end of said mold, and means adapted to abut the core portions and form a core adapted to extend throughout the mold.

52. In apparatus of the character described, in combination, an upright supporting frame, a mold adapted to be supported in stationary position on said frame, a longitudinally movable shaft adapted to carry a core portion having a tapering molding end portion adjacent one end of said mold, a platform adapted to support a second core portion adjacent the opposite end of said mold, and means adapted to abut the core portions and form a core adapted to extend throughout the mold.

53. In apparatus of the character described, in combination, an upright supporting frame, an upright alining tongue connected thereto, a mold adapted to be supported in stationary position on said frame and engaging said tongue, a longitudinally movable shaft adapted to carry a core portion adjacent one end of said mold, a platform adapted to support a second core portion adjacent the opposite end of said mold, and means adapted to abut the core portions and form a core adapted to extend throughout the mold.

54. In apparatus of the character described, in combination, an upright supporting frame, an upright alining tongue connected thereto, a mold adapted to be supported in stationary position on said frame and engaging said tongue, a longitudinally movable shaft adapted to carry a core portion adjacent one end of said mold, a platform adapted to support a second core portion adjacent the opposite end of said mold guided on said tongue, and means adapted to abut the core portions and form a core adapted to extend throughout the mold.

55. In combination, an upright supporting frame, a table having an opening projecting therefrom and adapted to support a mold, an upright alining tongue connected to said frame and extending above and below the table, a longitudinally movable shaft carrying a core portion on one side of said mold, a platform carrying a second core portion on the opposite side of said mold, means on the mold and one of the core portions adapted to engage said tongue, and means adapted to abut the core portions and form a core co-extensive with the mold.

56. The method of molding pipe from a mass of plastic material, comprising driving the material from the central portion toward the side of the mold to condense the material and produce a pipe wall, troweling said wall, and then compressing the material to further condense the same.

57. In an apparatus of the character described, in combination, a mold, a fill-ram adapted to enter the mold at one end, and a ram adapted to enter the mold at the other end and having a shoulder adapted to mold the end of the pipe.

58. In an apparatus of the character described, in combination, a shell having a mold opening therethrough, a ram adapted to pass through the opening, a fill-ram, means for yieldingly supporting the fill-ram in the path of the ram, and means to positively move the ram into and out of the shell.

59. In apparatus of the character described, in combination, an upright supporting frame, a stationarily positioned mold-supporting device projecting therefrom, a longitudinally movable shaft adapted to carry a core portion on one side of said mold-supporting device, a platform adapted to support a second core portion on the opposite side of said mold-supporting device, means adapted to abut the core portions and form a core co-extensive with the mold, and means to positively move the shaft toward and from the mold-supporting device.

60. In apparatus of the character described, in combination, an upright supporting frame, a stationarily positioned mold-supporting table having an opening projecting therefrom, a longitudinally movable and rotatably mounted shaft adapted to carry a core portion on one side of said mold-supporting device, a platform adapted to support a second core portion on the opposite side of said mold-supporting device, means adapted to abut the core portions and form a core co-extensive with the mold, and means to positively move the shaft toward and from the mold-supporting device.

61. In apparatus of the character described, in combination, an upright supporting frame, an upright alining tongue connected thereto, a stationarily positioned mold-supporting device projecting therefrom, a longitudinally movable shaft adapted to carry a core portion on one side of said mold-supporting device, a platform adapted to support a second core portion on the opposite side of said mold-supporting device and slidable on said tongue, means adapted to abut the core portions and form a core co-extensive with the mold, and means to positively move the shaft toward and from the mold-supporting device.

62. In apparatus of the character described, in combination, an upright supporting frame, a mold adapted to be supported in stationary position on said frame, a longitudinally movable shaft adapted to carry a core portion adjacent one end of said mold, a platform adapted to support a second core portion adjacent the opposite end of said mold, means adapted to abut the core portions and form a core adapted to extend throughout the mold, and means adapted to positively move the shaft toward and from the mold.

In testimony whereof I affix my signature, in the presence of two witnesses.

ROBERT LEE RICKMAN.

Witnesses:
JOHN D. SIBBALD,
ELIZABETH BURGET.

Copies of this patent may be obtained for five cents each, by addressing the "Commissioner of Patents, Washington, D. C."